US007395964B2

(12) United States Patent
Anderson et al.

(10) Patent No.: US 7,395,964 B2

(45) Date of Patent: Jul. 8, 2008

(54) SECURE VOTING SYSTEM

(75) Inventors: Jay H. Anderson, Fishkill, NY (US); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 11/162,297

(22) Filed: Sep. 6, 2005

(65) Prior Publication Data

US 2007/0051804 A1 Mar. 8, 2007

(51) Int. Cl.
*G06K 17/00* (2006.01)
*G07C 13/00* (2006.01)

(52) U.S. Cl. .......................... 235/386; 705/12; 235/51; 235/56

(58) Field of Classification Search ................ 235/386, 235/51-56; 705/12; 434/306
See application file for complete search history.

(56) References Cited

U.S. PATENT DOCUMENTS 4,641,240 A 2/1987 Boram
4,641,241 A * 2/1987 Boram ........................ 705/12
5,875,432 A * 2/1999 Sehr ............................ 705/12
5,878,399 A 3/1999 Peralto
5,991,519 A 11/1999 Benhammou
6,412,692 B1 * 7/2002 Miyagawa .................. 235/386
6,633,055 B2 10/2003 Bertin et al.
6,641,050 B2 11/2003 Kelley et al.
6,688,517 B1 2/2004 McClure et al.
7,165,180 B1 * 1/2007 Ducharme .................. 713/182

* cited by examiner

*Primary Examiner*—Steven S Paik
*Assistant Examiner*—Christle I Marshall
(74) *Attorney, Agent, or Firm*—DeLio & Peterson, LLC; Kelly M. Nowak; Ronald Kaschak

(57) ABSTRACT

Methods, systems and program products for securely voting by providing a secure voting module in communication with a voting device. A voter signs onto the voting device using a unique voter identification, and the voter's voting selections are written to the voting device. A scrambled voter identification is generated using the unique voter identification and a unique encryption value of the secure voting module, whereby the voting selections and the scrambled voter identification are stored in the secure voting module. Once voting has ended, first and second fuses are blown within the secure voting module for destroying the unique encryption value and for permanently storing the voting selections and scrambled voter identification in a read only secure voting module that maintains voter anonymity while preventing any further physically writing thereto. The voting results may then be counted, re-counted or validated.

19 Claims, 3 Drawing Sheets

SECURE VOTING SYSTEM

BACKGROUND OF THE INVENTION

1. Field of the Invention

The present invention is directed generally to electronic voting, and in particular, to methods, systems and apparatus for controlling voting by using a secure voting system that validates voting results.

2. Description of Related Art

Voting machines for casting ballots during an election are well known. Conventional types of voting machines include those that make use of paper ballots or mechanical counters. However, many problems exist with these conventional voting machines. For instance, voting machines making use of paper ballots are undesirably subjected to the destruction and/or physical damage of such ballots, or even the possibility of paper ballots being altered. Paper ballots are also undesirable since they are subject to incorrect voting results due to voters punching the wrong holes in the ballots and the cumbersome tasks of reading and tabulating voting results for such paper ballots (particularly for write-in votes), in addition to numerous other problems associated with paper balloting.

Mechanical voting machines are an alternative to paper ballot voting. These types of voting machines generally involve the use of switches, levers, counters, or the like. When using mechanical voting machines, voters cast their vote by manipulating switches or levers, whereby once the voting period has ended, the counters of such machines are tabulated and the voting results reported to the appropriate entity. However, a common problem associated with these types of voting machines is that they require a significant amount of costly repair and maintenance, and are also expensive to operate. Many mechanical voting machines are now over 70 years old and are increasingly prone to breakdowns.

Electronic voting systems have been developed to overcome the problems associated with the above-described conventional voting systems and machines. In electronic voting, the voting systems generally involve electronically operated voting machines coupled with a central computer, and as such are capable of performing a variety of functions, such as counting votes for a voting site, counting votes for a particular voting booth, accumulating votes for a plurality of simultaneous elections, and the like. Electronic voting systems are advantageous over conventional voting approaches since they provide greater speed and accuracy, and eliminate the cumbersome task of mechanically tabulating voting results.

Many known computer-based electronic voting systems utilize transportable memory cartridges for configuring voting machines and for storing recorded data. For instance, U.S. Pat. Nos. 4,641,240 and 4,641,241 to Boram disclose a memory cartridge for an electronic voting system. The memory cartridge includes two read only memories that are electrically erasable read only memories (EEPROM) and a third read only memory that is a non-electrically erasable read only memory (EPROM). Prior to the election, the cartridge is inserted into the voting machine for setting up the voting machine, and during the election, the memory cartridge remains inserted in the voting machine for storing running totals of cast votes. At the end of the election, the running total of votes is stored in the EPROM of the memory cartridge by blowing a fuse of the cartridge. The cartridge is removed from the voting machine and transported to the election headquarters for totaling the results.

While the Boram memory cartridge provides security for election tally integrity, the cartridge does not prevent a voter from voting twice, nor does it store the voting results as forever read only. Accordingly, exposing the EPROM to UV and/or replacing the blown fuses within the cartridge will erase the voting results stored in the EPROM. There are additional problems associated with electronic voting machines, including perhaps the most pervasive problem of preventing unauthorized access and tampering with votes recorded by the voting machines.

Accordingly, a need therefore exists for improved electronic voting systems that store voting results in a secure manner, wherein the data storage medium is unerasable once written thereto. All of the data storage media should have a long shelf life and be highly resistant to damage. Additionally, the data storage media should be immune to electromagnetic interference and/or UV exposure.

SUMMARY OF THE INVENTION

Bearing in mind the problems and deficiencies of the prior art, it is therefore an object of the present invention to provide an improved electronic voting system, methods and apparatus for securely voting and validating such voting results.

Another object of the present invention is to provide improved electronic voting systems, methods and apparatus that permanently stores voting results, ensure that voters securely vote only once, and allow for the validation of voting results.

It is another object of the present invention to provide improved electronic voting systems, methods and apparatus that are easy to use both for the voters and for election officials having little training.

A further object of the invention is to provide secure voting modules for storing voting results in an indelible medium that is not easily destroyed or damaged, and cannot be erased, tampered with, altered or overwritten.

It is yet another object of the present invention to provide secure voting module hardware that stores voting results in a permanent forever read only state such that these voting results can be validated, counted and re-counted at any time.

Still other objects and advantages of the invention will in part be obvious and will in part be apparent from the specification.

The above and other objects, which will be apparent to those skilled in art, are achieved in the present invention, which is directed to a method for secure voting by first providing a secure voting module having a unique encryption value in communication with a voting device having a computer interface connected to a server. A voter is signed onto the voting device during a voting session using a unique voter identification, and the voter's voting choices are written to the server. A scrambled voter identification is generated using the unique voter identification and the unique encryption value, and the voter's stored voting choices and the scrambled voter identification are stored in the secure voting module. Upon the completion of voting, a first fuse is blown within the secure voting module for destroying the unique encryption value, while a second fuse is blown within the secure voting module for permanently storing the voting choices and the scrambled voter identification on the secure voting module. These first and second fuses are preferably non-replaceable fuses.

In this aspect of the invention, the method may further include determining if the secure voting module is being used for a first time for the present secure voting. Wherein the module is being used for a first time for secure voting, it must then be determined whether or not the module is suitable for use in the present secure voting method and system by searching for any blown fuses within the module. In the event the module contains blown fuses, then a notification is sent that the module is unsuitable for use and must be replaced. The module is removed from communication with the voting device and a new secure voting module is provided in communication with the voting device. This process is repeated until a module that contains no blown fuses (i.e., is valid or suitable for use) is in communication with the voting device. However, if it is determined that the module is not being for the first time, then a voting location identification, voting date and voting template are written to a storage device of the secure voting module.

In addition to the above method steps, it may also be determined whether or not the voter previously voted using the secure voting module by searching for a stored scrambled voter identification for the voter within the secure voting module. These steps may be repeated for a plurality of voters, whereby each voter is provided with a unique scrambled voter identification that is stored in the secure voting module along with corresponding votes of each voter.

The fuses within the secure voting module are preferably blown once it is determined that voting has ended. This may be accomplished by sending a first signal to blow the first fuse and a second signal to blow the second fuse. Once the fuses have been blown within the module, making it forever read only, the voting results may then be counted and re-counted or validated. Blowing fuses within the module makes the module a forever read only secure voting module that maintains voter anonymity while preventing any further physically writing thereto.

In another aspect, the invention is directed to a secure voting system. The secure voting system includes a secure voting module in communication with a voting device having a computer interface connected to a server, whereby the secure voting module has a unique encryption value. An encryption function of the system generates scrambled voter identifications using the unique encryption value and unique voter identifications for each voter. A storage device of the secure voting module stores the scrambled voter identifications and votes of each voter. The system also includes a program of instructions for blowing a first fuse of the secure voting module to destroy the unique encryption value and for blowing a second fuse of the secure voting module for permanently storing the votes and the scrambled voter identifications upon completion of voting.

In yet another aspect, the invention is directed to a program storage device readable by a processor capable of executing instructions, tangibly embodying a program of instructions executable by the processor to perform method steps for securely voting using a secure voting module that is in communication with a voting device having a computer interface connected to a server. The method steps include providing a unique voter identification to a voter signing onto the voting device, generating a scrambled voter identification using the unique voter identification and a unique encryption value of the secure voting module, and storing the scrambled voter identification and the voter's voting choices selected on the voting device in the secure voting module. A first fuse within the secure voting module is blown for destroying the unique encryption value, while a second fuse within the module is blown for permanently storing the voting choices and the scrambled voter identification on the secure voting module.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1A:
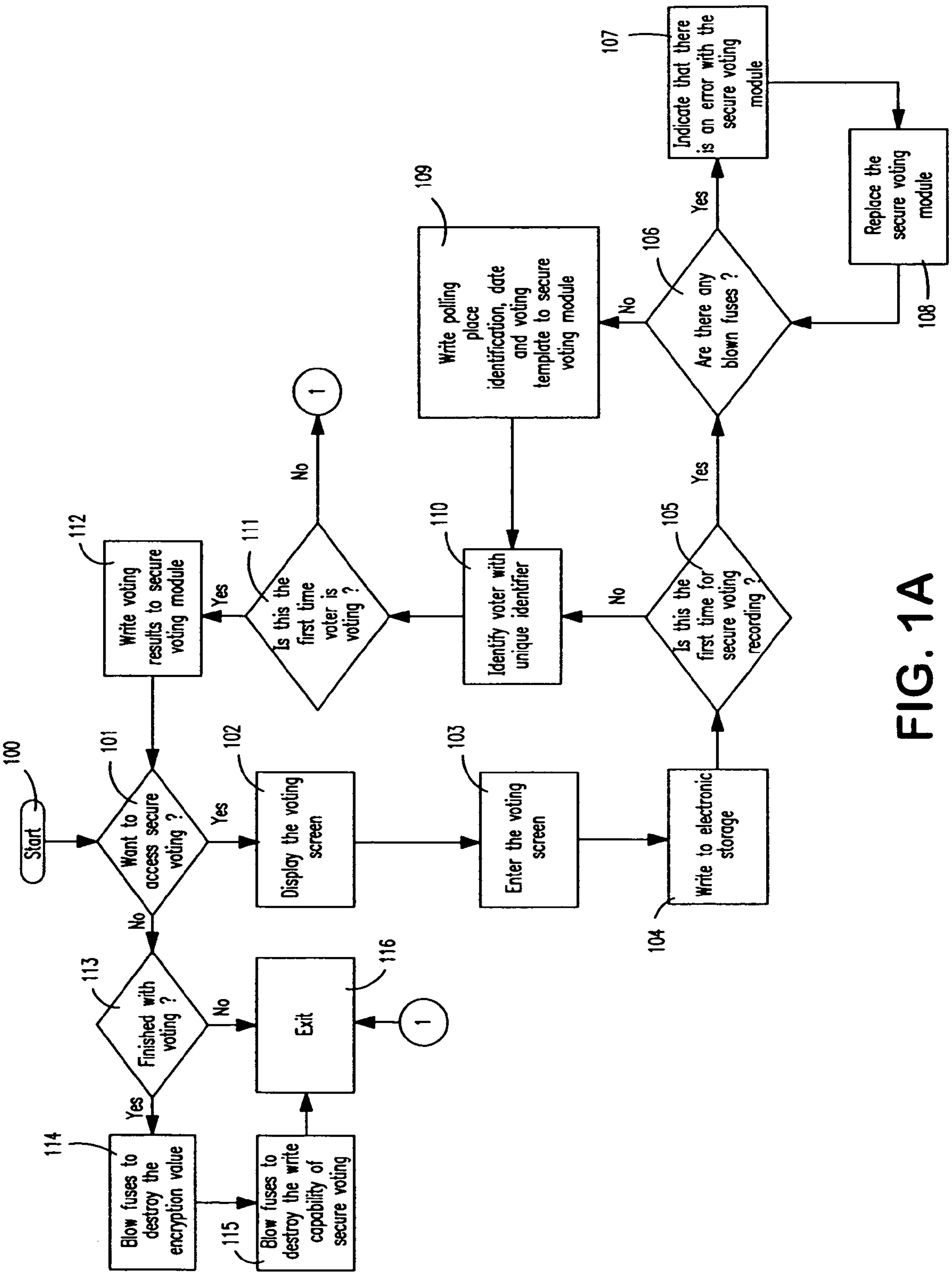
FIG. 1A is a flow diagram illustrating method steps of securely voting using the secure voting system of the invention.

In describing the preferred embodiments of the present invention, reference will be made herein to FIGS. 1A-2 of the drawings in which like numerals refer to like features of the invention. In the process flows of FIGS. 1A-2, numerals in circles indicate connections to and from other parts of the flow chart.

The present invention provides methods, systems and apparatus for controlling voting using a computerized secure voting system that employs a transportable, secure voting module. This secure voting module at least contains electronic circuitry including non-replaceable electronic fuses, a memory chip for storage of voting results (e.g. a semiconductor chip), and circuitry for running a software component of the invention. The secure voting module advantageously permanently stores voting results, ensures that a voter securely votes only once and allows for the validation of such voting results.

The voting module, with its non-replaceable fuses, preferably is constructed using e-fuse technology as described in U.S. Pat. No. 6,641,050 to Kelley et al. and U.S. Pat. No. 6,633,055 to Bertin et al., both of which are assigned to the same assignee as the present invention. A very large number of discrete, individually addressable electronic fuses may be fabricated and packaged in a relatively small, portable module along with a very large number of electronic memory devices. This in turn permits recording of a large number of votes along with identification and security data, discussed in more detail below.

The voting module may be constructed as a large array of conventional semiconductor memory devices (e.g. a CMOS memory chip where individual memory cells are accessible from the outside of the chip by read/write conductors), with the added feature of e-fuses on the write conductors (or other conductors leading thereto) so that writing to the memory devices is not possible after the fuses are blown. Alternatively, the voting module may be constructed as a large array of e-fuses which themselves function as permanent memory devices (e.g. an open circuit formed by blowing a fuse at a particular location is equivalent to one bit in a conventional semiconductor memory device). In this instance writing to the voting module is performed by blowing a selected fuse, and reading is performed by electrically testing the array of e-fuses for the presence of open circuits.

In accordance with the invention, the secure voting module is built and adapted to communicate with a voting machine that preferably includes a terminal, display screen and computer interface connected to a server. Upon providing the secure voting module in communication with a voting machine, the present system and method are initiated (step 100) whereby data relating to the particular voting session is written to the server. This data preferably includes, but is not limited to, writing a unique identifier of the voting machine (e.g. voting booth or machine number) in combination with a voting date to the server that is in communication with the voting machine. It is then determined whether or not a user would like to access a secure voting session (step 101).

In the event access to the present secure voting system is desired, the computer interface displays a voting screen on the display screen of the voting machine for viewing by voters (step 102). This voting screen at least displays all voting options to the voter. These options may include, but are not limited to, candidates, topics, issues, questions, and the like, and even combinations thereof. Prior to voting, in accordance with the invention, a registered voter must first sign onto the voting machine using a unique identification (step 103). This unique identification is used to validate the identity of the registered voter, and may include, but is not limited to, a password associated with the voter or distributed to the registered voter prior to voting, the voter's name, social security number, fingerprint or other biometric data, and the like. The voting machine's unique identification (i.e., voting booth number) is then automatically attached to the voter's unique identification to generate a voter validation identification, which is used later in the present system for validating the voting results.

Once signed onto the voting machine employing the present invention, the voter then electronically makes a selection(s) from the voting options displayed on the voting screen and casts his/her vote(s) (step 103). The cast votes are electronically stored in the server of the voting machine (step 104), and are then sent to a central server for processing. After the voter's vote(s) are electronically stored in the server, it is then determined whether or not the current voting of this voter is the first voting selection to be stored in the secure voting module of the invention (step 105).

If the current voting session is the first voting session for the secure voting module (i.e., the first vote to be stored on the module), it then must be determined whether or not the secure voting module is valid for use in such voting session (step 106). This is accomplished by enabling circuitry of the secure voting module determining whether or not any electronic fuses have been blown within the module. If it is determined that blown fuses exists within the module, the enabling circuit prevents any writing of data to the storage device thereof. A user of the invention (e.g. the voter, a person operating or managing the voting machine or session, etc.) receives a notification that the secure voting module contains blown fuses (step 107), and as such, data cannot be written thereto. In such an event, the secure voting module is replaced with a new secure voting module of the invention (step 108), and the process repeated until it is determined that a secure voting module containing no blown fuses is in communication with the voting machine.

Providing the secure voting module with non-replaceable electronic fuses advantageously ensures that the voting module being used for a voting session contains no critical stored voting results from previous voting session. That is, once the non-replaceable electronic fuses of a secure voting module have been blown, further writing to the storage device of such module is prevented, thereby permanently protecting and maintaining any voting results stored on the secure voting module.

Once a valid secure voting module (i.e., a secure voting module containing no blown fuses) is in communication with the voting machine, the voting location (i.e., polling place) identification, date and voting template are written to the storage device of the secure voting module (step 109). The voting template may include, candidates, topics, issues, questions, and the like, and combinations thereof. The system then identifies the voter by scrambling the voter's unique sign-on identification to provide a unique scrambled voter ID (step 110). In so doing, each secure voting module has a unique encryption value, whereby the voter's sign-on identification and the module's unique encryption value are used in an encryption function for generating the scrambled voter ID. The unique encryption value may be any type of value including, but not limited to, an identification, number, set of numbers, date(s), letter(s), word(s), symbol(s), and the like, or even combinations thereof. Also, any type of encryption function may be used in the invention, such as, for example, an encryption algorithm.

Figure 1B:
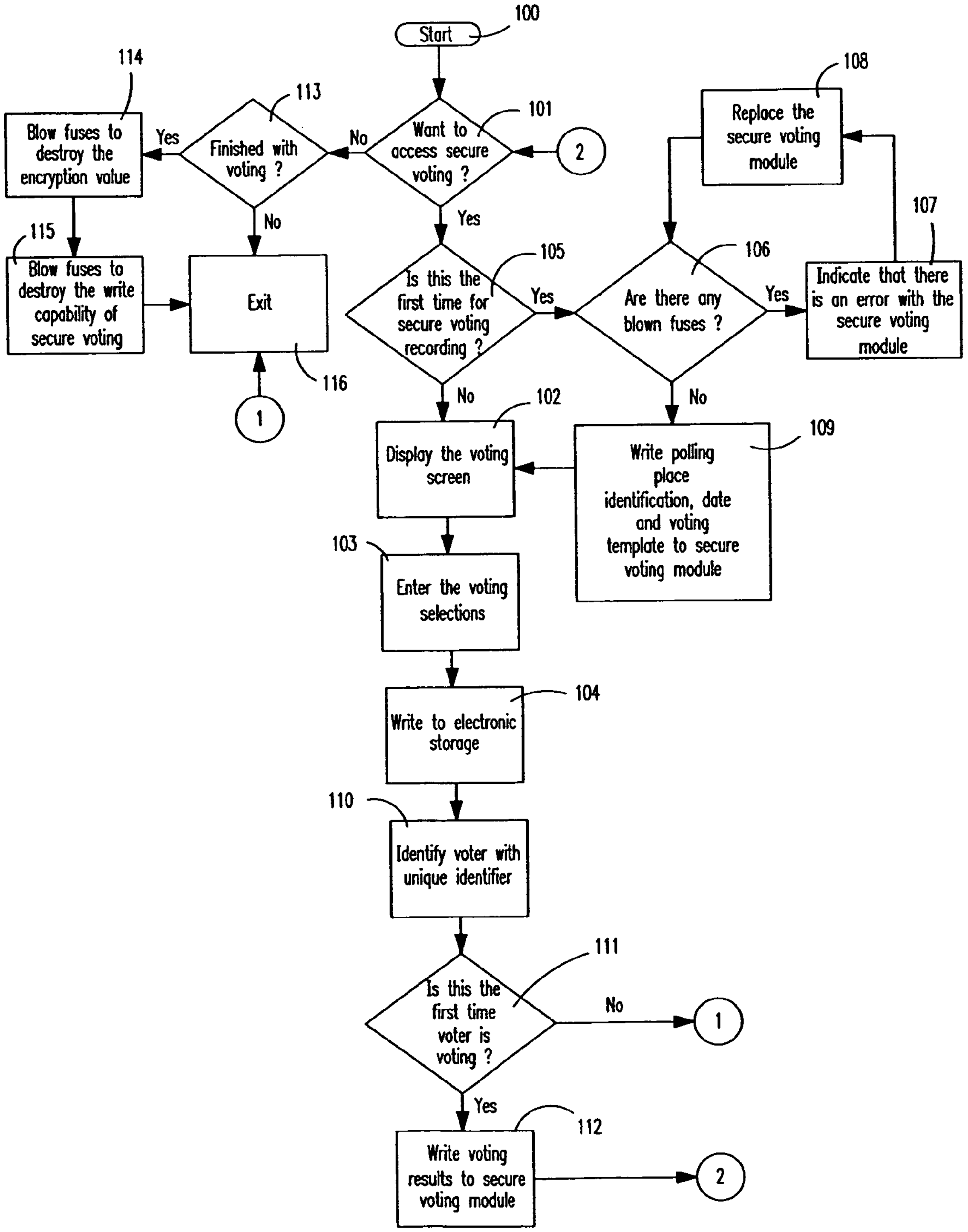
FIG. 1B is a flow diagram illustrating alternative method steps of securely voting using the secure voting system of the invention.
Figure 2:
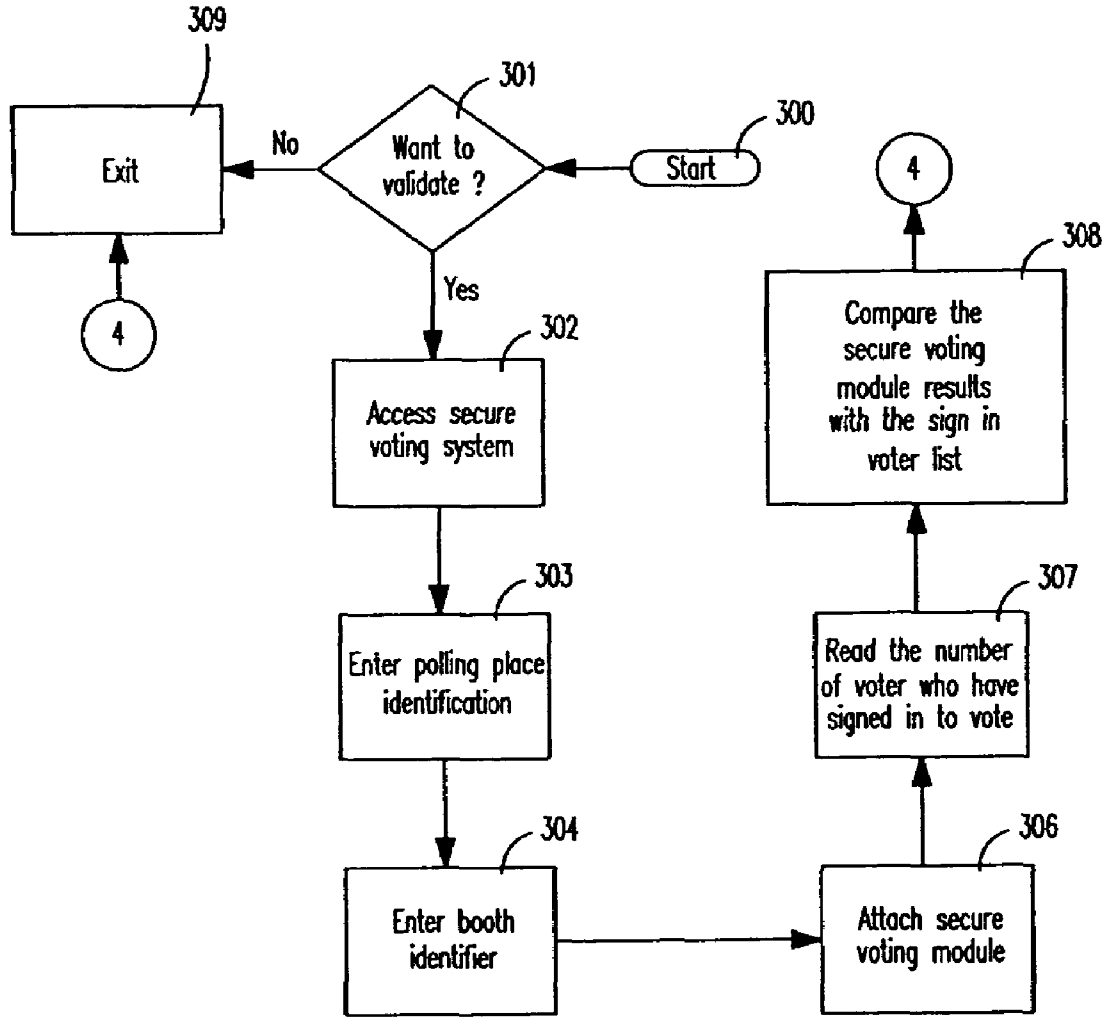
FIG. 2 is a flow diagram illustrating the method steps of validating the voting results of FIGS. 1A and 1B.

FIG. 1B shows an alternative embodiment, wherein the above validation process may be performed after accessing the secure voting system in step 101. In this aspect, once the secure voting system is accessed, it is determined if it is the first time voting (step 105), and if yes, the process flow of steps 106 to 108 are repeated until a valid module is located. Once a valid module is in communication with the voting machine (step 106), the voting location (i.e., polling place) identification, date and voting template are written to the storage device of the secure voting module (step 109), and the voting screen is displayed (step 102), the voter's selections entered (step 103), and then these selections are written to the server of the voting machine (step 104). The system then identifies the voter by scrambling the voter's unique sign-on identification to provide a unique scrambled voter ID (step 110).

Referring to FIGS. 1A-B, after the voter's identification has been encrypted, it is then determined whether or not the voter is voting for the first time (step 111). In so doing, the software running on electronic circuitry of the secure module, which controls writing to the storage device thereof, is synchronized to the voting on the software interface of the voting machine. This software will only allow a voter to cast votes once. The software running on the enabling circuitry of the module checks the module storage device for a stored scrambled voter ID for the voter. If no stored scrambled voter ID is located, then it is the voter's first time voting and his/her scrambled voter ID is written to and stored in the module storage device, along with the voter's cast vote(s) and the voter validation identification (step 112).

However, if the voter is voting for a second time (i.e., he/she already has a stored scrambled voter ID), the invention provides the voter with a new scrambled voter ID, and the software running on the enabling circuitry searches for a stored scrambled voter ID for such voter. Once a stored scrambled voter ID is located, software compares the stored scrambled voter ID to the new scrambled voter ID, and if this new scrambled voter ID matches and/or links such voter to the voter's stored scrambled voter ID, then the module software will not allow writing of the new scrambled voter ID. As such, the scrambled voter ID advantageously prevents the voter from voting more than once, in addition to enabling anonymous voting.

Once the voter's vote(s) and scrambled voter ID have been written to and stored in the module's storage device, a next subsequent voter may utilize the invention. For this next voter, it is then determined whether or not the secure voting of the invention is to be accessed (step 101). If yes, the above process is repeated for this next subsequent voter. However, if secure voting is not desired, it must then be determined whether or not the current voting session is finished (step 113). If the voting session is not finished, the system may be advantageously exited (step 116) and restarted either immediately thereafter or at a later time (step 100).

Wherein it is determined that the current voting session is finished, software running on the enabling circuitry of the secure voting module sends a signal to the module circuitry to blow at least one non-replaceable fuse, or several non-replaceable fuses, within the module for destroying the unique encryption value that was used in the scrambling function (step 114). By destroying the unique encryption value of the secure voting module, decrypting of the scrambled voter IDs stored in the module is prevented, thereby ensuring that the permanent record of the recorded votes is anonymous. The module software also sends a signal to circuitry for blowing at least one non-replaceable fuse, or several non-replaceable fuses, to destroy the write capability of the module for controlling and making the module forever read only (step 115). The blowing of fuses function in steps 114 and 115 may be set manually or automatically by the system (e.g., at a predetermined time such as, for example, at the end of the voting period).

Thus, in accordance with the invention, by integrating non-replaceable electronic fuses into the secure voting module, once these fuses are blown, the final voting module is advantageously a non-erasable piece of hardware (e.g. non-optically erasable) that permanently stores voting results and maintains the voting choices of each voter confidential, as well as preventing any further physically writing to the module.

Once the fuses of the module have been blown, and the module is in a permanent read only state, the voting results can be tabulated and validated. In so doing, the final secure voting module is detached from communication with the voting device, and provided in communication with a counting and validation device, such as, a second computer. Once in communication therewith, the voting results stored in the final read only secure voting module is read into this counting and validation computer for tabulating the results and validating that the number of votes counted on the particular secure voting module matches the number of voters that voted on such module. This is preferably accomplished by comparing the number of votes stored on the server of the voting machine (whereby this number is stored in the secure module storage device upon blowing fuses) with the voting template and number of votes stored on the storage device of the secure voting module.

The invention also validates that particular voters actually voted in an election by reading the stored voter validation identification (which includes the voter's unique identification in combination with the voting machine's unique identification) from the final secure voting module. This voter validation information advantageously eliminates the need for a voter signature on a sign-in log, and may be used later to tie a particular vote to a particular voting booth for voting results audit purposes. This process of counting and validation is repeated for all secure voting modules of the invention used within an election. It is noteworthy that since the voting results are permanently stored in the present final secure voting modules, these voting results are never lost or destroyed, and as such, may be counted, recounted and/or validated at any point in time.

It should be appreciated that parts of the present invention may be embodied as a computer program product stored on a program storage device. The program storage devices of the present invention may be devised, made and used as a component of a machine utilizing optics, magnetic properties and/or electronics to perform the method steps of the present invention. Program storage devices include, but are not limited to, magnetic diskettes, magnetic tapes, optical disks, Read Only Memory (ROM), floppy disks, semiconductor chips and the like. A computer readable program code means in known source code may be employed to convert the methods described below for use on a computer.

For ease of understanding the invention, the below process flow is described in relation to FIGS. 1A and 2, however, it should be appreciated and understood in accordance with the foregoing description of the invention that other process flows may be implemented for carrying out the present invention of securely voting using the secure voting module of the invention, such as, for example, the process flow shown in FIG. 1B.

100 Start. Start the process flow by positioning the present secure voting module having non-replaceable electronic fuses in communication with a voting machine for implementing the present system and method for securely voting and validating such voting results. The process flow goes to step 101.

101 Want to access the secure voting system? Once the system is initiated, it is then determined whether or not a registered voter wants to access the secure voting system. If this voter decides to access the secure voting system, the process flow continues to step 102. If, however, the voter does not want to access the secure voting system, the process flow continues to step 113.

102 Display the voting screen. Upon a voter accessing the secure voting system, a display screen of the voting machine that is visible to the voter shows the voting options that the voter is to select from. These voting options include, but are not limited to, candidates, issues, topics, questions, and the like. The process flow continues to step 103.

103 Enter the voting selections. Prior to the voter casting his/her vote(s), the voter must sign into the present system that is running on the voting machine using a unique identification. Upon the voter signing in, the secure voting module of the invention reads the voting machine's unique identification (i.e., voting booth number) that is stored in the server in communication with the voting machine and automatically attaches such voting machine unique identification to the voter's unique identification. In so doing, the voting machine identification may be attached either at the beginning or end of the voter's unique identification, or it may be interjected and/or mixed within the voter's unique identification. This combination of the voting machine-voter unique identification is stored on the server of the voting machine, and is used in a later validation process. Once signed into the present system, the voter may then select and cast his/her voting choices from the voting options displayed on the screen. The process flow continues to step 104.

104 Write the selections to electronic storage. Once the voter has entered his voting selections into the present system, these selections are stored in the server of the voting machine along with the voting machine identification. This information may be used later for validation and voting result audit purposes. The process flow continues to step 105.

105 Is this the first time that secure voting is recorded in the secure voting module? It is then determined whether or not the current voter is the first voter to select, cast and store his/her voting selections within the present secure voting module running on the voting machine. If the voter is the first voter employing such secure voting module, then the process flow continues to step 106. If, however, the voter is not the first voter to use this secure voting module, then the process flow continues to step 110.

106 Are there any blown fuses? It may then be determined whether or not the present secure voting module is valid for use in accordance with the invention. This is accomplished by software running on the module sending a signal to check for any blown non-replaceable electronic fuses within the module.

If blown fuses exist within the module, then a notification is sent to a user of the invention that the particular module is unsuitable for use within the current voting session since these blown fuses will prevent any writing to the storage device of the module. In this event, the process flow will continue to step 107.

If, however, it is determined that no blown fuses exist within the module, then such module is fit for use in the current session since voting selections can be written to the storage device thereof. Wherein the module is valid or suitable for use in the current session, the process flow continues to step 109.

107 Indicate that there is an error with the secure voting module and that it cannot be used. Upon detection of non-replaceable blown fuses within the secure voting module, the notification is sent to the user for indicating that data cannot be written to such module. This security feature of the invention advantageously prevents anyone from writing to a secure voting module containing previous voting results, or voting on a module after a voting period has ended. The process flow continues to step 108.

108 Replace the invalid secure voting module with a new secure voting module. Upon detection and notification of a secure voting module containing blown non-replaceable fuses, such voting module is physically replaced with a new secure voting module. This process flow of steps 106-108 is repeated until a valid secure voting module that is suitable for use in accordance with the invention is in communication with the voting machine. The process flow continues to step 109.

109 Write the polling place identification, date and voting template to the secure voting module. Once a valid module for use in accordance with the invention is in communication with the voting machine, the voting location (i.e., polling place) identification, date and voting template are written to the storage device of the secure voting module. The process flow continues to step 110.

110 Identify voter with a unique identifier. The system then protects the identity of the voter by providing such voter with a unique scrambled voter ID. This is accomplished by the voter's sign-on identification from step 103 and the module's unique encryption value being encrypted using an encryption function that generates the scrambled voter ID. In so doing, each secure voting module has an encryption value that is unique to such module. This unique scrambled voter ID is used to prevent the voter from voting more than once. The process flow continues to step 111.

111 Is this the first time voter is voting? Once the voter is provided with a unique scrambled voter ID of the invention, it is then determined whether or not this voter has voted previously by locating a stored unique scrambled voter ID for such voter. This is accomplished by software running on the enabling circuitry of the module checking the module storage device for a stored scrambled voter ID for the voter.

If no stored scrambled voter ID is located, then it is the voter's first time voting and the process flow continues to step 112.

However, if a stored unique scrambled voter ID is located for such voter, then the voter has already voted on such module, and the voter is prevented from voting a second time. In such an event, the process flow continues to step 116 where the voter is exited from the system and a next subsequent voter may access the process flow at steps 101 et al.

112 Write voting results to the secure voting module. Once it is determined that the voter is voting for the first time, the voter's unique scrambled voter ID and cast vote(s) are stored to the storage device of the secure voting module in communication with the voting machine. The process flow continues to step 101 for the next voter to vote in accordance with the present invention.

The above process flow steps may be repeated for each subsequent voter using the invention until it is determined in step 101 that access to the present secure voting system is no longer desired. When access to the present secure voting system is no longer desired, the process flow continues to step 113.

113 Finished with voting? It is then determined whether or not the voting period, or session, using the present secure voting modules is complete (e.g., the voting period or polls have closed). If the voting has not ended, the process flow continues to step 116 where the system is exited, and may be subsequently re-entered by a voter following the process flow steps 101 et al. This step of exiting the system advantageously allows for the taking of breaks during the voting period, without blowing any fuses within the module and/or ending the voting session on the voting machine. However, in the event that the voting period has ended, the process flow continues to step 114.

114 Blow fuses to destroy the encryption value. Once the voting period is finished (e.g., the polls have closed and there will be no further votes tabulated), software running on the enabling circuitry of the secure voting module sends a signal to the module circuitry to blow non-replaceable fuse(s) within the module for destroying the unique encryption value that was used in the scrambling function. The destruction of the unique encryption value advantageously prevents decrypting the unique scrambled voter IDs, thereby allowing voters to vote anonymously. The process flow continues to step 114.

115 Blow the fuses to destroy the write capability of the secure voting module. Also at the end of the voting period, the module software sends a signal to circuitry for blowing non-replaceable fuse(s) within the module for destroying the write capability of the module, thereby controlling and making the module forever read only. The process flow continues to step 116.

116 Exit. The system and process flow of the invention is exited, but may be later re-entered as discussed above.

After the voting period has ended and non-replaceable fuses have been blown within the secure voting modules of the invention, making such modules permanently read only, the process flow of the invention continues by tabulating and validating the voting results. This continued process flow is shown in FIG. 2, and is described below as follows:

300 Start. Start the process flow for secure voting counting and validation. The process flow continues to step 301.

301 Want to validate? It is then determined whether or not the voting results stored in the secure voting modules of the invention are to be validated, counted and/or re-counted. If validation and/or counting is not desired, the process flow continues to step 309 and the system exited. However, if validation and/or counting of the voting results permanently stored in the secure voting modules is desired, the process flow continues to step 302.

302 Access the secure voting system. The present system for validating and/or counting voting results stored on the final secure voting modules of the invention is accessed on a counting and/or validation device, such as, second computer. The process flow continues to step 303.

303 Enter the polling place identification and date of the election. The identity and voting date of each voting location (e.g., for each polling place) where voting in accordance with the invention was conducted are entered and stored within a database of the counting/validation device. The process flow continues to step 304.

304 Enter the voting booth identifier. The individual voting machine identifications (e.g., voting booth number) for the corresponding voting locations and dates are entered into and stored within such database of the counting/validation device. The process flow continues to step 306.

306 Attach secure voting module. Once the identity and voting date of a voting location has been entered, and an individual voting machine identification located at such location has been entered within the counting/validation device, the corresponding read only final secure voting module of the invention that was in communication with such individual voting machine identification is provided within communication with the counting/validation device. The process flow then continues to step 307.

307 Read the number of voters who have signed into vote. The number of voters that signed onto the particular voting machine (i.e., from step 103, whereby this number is stored in the storage of the read only secure voting module) is then read from the module into the counting/validation device and stored therein. The actual voting results are also read from the read only module and stored within the counting/validation device. The process flow then continues to step 308.

308—Compare the secure voting module results with the sign in voter list. Once the voting results and the number of voters that signed onto the voting machine are read and stored within the counting/validation device, these voting results are compared with the number of voters for counting the votes and validating that all voters' votes are accounted for. That is, if there is a match in the number of voters who have signed in to vote and the recorded number of voters in the read only module, then all votes employing the present secure voting modules are accounted for and the voting results are accurate. In so doing, the voting template may be used to sum the votes for the various topics, issues, candidates, etc. that reside on the voting ballot. The process flow then continues to step 309.

309 Exit. This validation, counting and re-counting process flow may be exited and re-entered by following the process flow steps 300 et al. The above process flow steps 300-309 may also be used during an auditing of voting results at any time since the non-replaceable fuses within the secure voting modules make such modules forever read only, such that the voting results will never be lost, destroyed, tampered with and/or altered.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for secure voting comprising:

providing a secure voting module having a unique encryption value in communication with a voting device;

signing a voter onto said voting device using a unique voter identification;

generating a scrambled voter identification using said unique voter identification and said unique encryption value;

storing said voter's voting choices selected using said voting device and said scrambled voter identification both on said secure voting module;

blowing a first fuse within said secure voting module for destroying said unique encryption value; and blowing a second fuse within said secure voting module for permanently storing said voting choices and said scrambled voter identification on said secure voting module.

2. The method of claim 1 wherein said voter identification is selected from the group consisting of a password, a name, social security number, fingerprint, biometric data, and combinations thereof.

3. The method of claim 1 wherein said voter selects said voting choices from a display screen on said voting device.

4. The method of claim 1 wherein said first and second fuses comprise first and second non-replaceable fuses.

5. The method of claim 1 wherein an encryption function generates said scrambled voter identification using said unique voter identification and said unique encryption value.

6. The method of claim 1 further including the step of determining if said secure voting module is being used for a first time for said secure voting.

7. The method of claim 6 wherein if it is determined that said secure voting module is being used for said first time, said method further including the step of determining if said secure voting module contains any blown fuses.

8. The method of claim 7 wherein said secure voting module contains blown fuses, said method steps further comprising:

sending a notification that said secure voting module contains blown fuses, said notification indicating that said secure voting module is invalid for use within said method steps;

replacing said secure voting module with a new secure voting module in communication with said voting device;

determining if said new secure voting module contains any blown fuses; and repeating said steps until a valid secure voting module is in communication with said voting device.

9. The method of claim 6 wherein if it is determined that said secure voting module is not being used for said first time, said method further including the step of writing a voting location identification, voting date and voting template to a storage device of said secure voting module.

10. The method of claim 1 further including, prior to said step of storing said voter's voting choices selected using said voting device and said scrambled voter identification both on said secure voting module, determining whether said voter previously voted using said secure voting module by searching for a stored scrambled voter identification for said voter within said secure voting module.

11. The method of claim 10 further including, upon locating said stored scrambled voter identification within said secure voting module, said method step of preventing said voter from voting a second time on said secure voting module.

12. The method of claim 10 wherein, upon said stored scrambled voter identification not being located within said secure voting module, said voting choices of said voter being first voting choices for said voter that are stored within said secure voting module along with said scrambled voter identification.

13. The method of claim 1 further including a plurality of voters voting on said voting device, whereby each of said plurality of voters is provided with a unique scrambled voter identification that is stored in said secure voting module along with corresponding voting choices of each said voter.

14. The method of claim 1 wherein a first signal is sent to blow said first fuse and a second signal is sent to blow said second fuse.

15. The method of claim 1 wherein said first and second fuses are blown after it has been determined that a voting period has ended.

16. The method of claim 1 further including the step of counting voting results permanently stored in said secure voting module after said first and second fuses have been blown.

17. The method of claim 16 further including the step of validating counted voting results permanently stored in said secure voting module after said first and second fuses have been blown.

18. The method of claim 1 wherein said steps of blowing said first and second fuses provide a read only secure voting module that maintains voter anonymity while preventing any further physically writing to said read only secure voting module.

19. The method of claim 1 wherein said step of storing said voter's voting choices further comprises blowing at least one non-replaceable fuse in said secure voting module.

* * * * *